(12) United States Patent
Ubowski

(10) Patent No.: US 6,389,125 B1
(45) Date of Patent: May 14, 2002

(54) SHARED INFORMATION BETWEEN MULTIPLE TELEPHONES

(75) Inventor: Richard M. Ubowski, Harleysville, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/204,566

(22) Filed: Dec. 4, 1998

(51) Int. Cl.[7] .......................... H04M 1/56; H04M 15/06
(52) U.S. Cl. ..................... 379/142.12; 379/142.07; 379/142.04; 379/142.01; 379/142.17
(58) Field of Search .................. 379/142.12, 93.17, 379/93.23, 156, 157, 252, 251, 257, 283, 198, 164, 167, 171, 284, 339, 67.1, 282, 127, 88.11, 88.23, 88.2, 93.08, 93.09, 100.16, 100.15, 142.17, 142.04, 142.01, 142.07; 455/415, 403, 413, 556, 557, 23, 42, 412

(56) References Cited

U.S. PATENT DOCUMENTS

| 5,228,073 A | * | 7/1993 | Smith ......................... 379/387 |
| 5,425,089 A | * | 6/1995 | Chan et al. .................. 379/183 |
| 5,463,676 A | * | 10/1995 | Ohsawa ...................... 379/142 |
| 5,623,537 A | * | 4/1997 | Ensor et al. ................. 379/142 |
| 5,809,111 A | * | 9/1998 | Matthews .................... 379/165 |
| 5,841,853 A | * | 11/1998 | Yamanishi et al. ......... 379/142 |
| 5,907,605 A | * | 5/1999 | Ramirez et al. ............. 379/142 |
| 5,920,615 A | * | 7/1999 | Nolde ......................... 379/142 |
| 6,134,320 A | * | 10/2000 | Swan et al. .................. 379/142 |

* cited by examiner

Primary Examiner—Curtis Kuntz
Assistant Examiner—Rexford N Barnie
(74) Attorney, Agent, or Firm—William H. Bollman

(57) ABSTRACT

A technique and apparatus allowing data transfer between multiple telephone devices on a common telephone line, e.g., to synchronize call related information such as Caller ID data. Data which may be transferred includes call related information to other devices on the common telephone line. The data transfer preferably occurs immediately after the call related information is received by a master device from the central office, e.g., between subsequent ring signals. Archival call related information relating to past incoming telephone calls may also be synchronized between the master and slave devices or between the slave devices using the data transfer.

23 Claims, 4 Drawing Sheets

SHARED INFORMATION BETWEEN MULTIPLE TELEPHONES

BACKGROUND OF THE INVENTION

1. Field of the Invention

This invention relates generally to telephones on a common telephone line. More particularly, it relates to data communications between telephones on a common telephone line.

2. Background of Related Art

In the United States, Calling Identity Delivery (Caller ID) has become a popular service which provides call related information regarding a calling party to a called party before the called party answers the incoming telephone call. Typical call related information includes, e.g., a telephone number and/or a household name of the calling party.

Many conventional telephones include the capability to receive call related information regarding a calling party, e.g., common telephones, speakerphones, facsimile machines, and voice messaging systems, to name a few.

FIG. 4 depicts one type customer premises equipment capable of receiving call related information, i.e., a voice messaging system such as a telephone answering device.

A conventional telephone answering device generally operates on a single telephone line and answers an incoming call of a calling party to an unused (i.e., on-hook) telephone after a desired number of rings. Generally, a telephone answering device causes the telephone line to enter an off-hook condition, then plays an outgoing greeting message to the calling party. After the outgoing greeting message has played in its entirety, the calling party can typically leave a voice message on the telephone answering device. At a later time, the voice message is replayed by the user, depending on the features of the telephone answering device, either local to the telephone answering device or via remote connection from another telephone.

FIG. 4 illustrates the use of two (or more) conventional telephone devices connected to a common telephone line within a home or office 15. In the shown example, a telephone answering device 11 and a speakerphone 13 are each capable of answering an incoming telephone call to the telephone line.

The telephone answering device 11 is connected to a common telephone line 19 from a telephone company central office 17, as is the speakerphone 13. Both devices include an appropriate telephone line interface (TLI) 21, 23 to provides the conventional isolation, DC and AC impedance as required by local telephone company standards. The telephone line interfaces 21, 23 also provide a ring detect signal to a respective controller 25, 27. The controllers 25, 27 can be any suitable processor, e.g., a microprocessor, a microcontroller, or a digital signal processor (DSP). The ring detect signal indicates to the controller 25, 27 the ringing of an incoming call on the telephone line 19. The controllers 25, 27 may also include, e.g., in program code or in an external device, respective dual tone multi frequency (DTMF) generators 33, 35 and/or DTMF decoders 29, 31 to output and detect dialed digits of a telephone number. The DTMF decoders 29, 31 may also be used to detect control sequences from a remote telephone relating to specific features of the telephone answering device 11 or speakerphone 13.

The conventional telephone answering device 11 illustrated in FIG. 4 may also include a Calling Identity Delivery (Caller ID) detector/receiver 51 to detect and receive call related information, e.g., the telephone number and/or household name of a calling party. Typically, the received call related information is stored in non-volatile memory such as a Caller ID log 97. Current and past entries in the Caller ID log 97 may be displayed on a display 49 as selected through push button control by the user.

By using Caller ID, the user of the conventional telephone answering device 11 can determine the name and telephone number of the calling party leaving the voice message. Basic call information such as Caller ID information is transmitted from the local telephone company to the called party while the called party's phone is in a hung-up or on-hook state, e.g., between the first and second rings.

Unfortunately, using conventional techniques, only one device on any one telephone line may communicate with the central office 17 to acknowledge receipt of call related information regarding an incoming call. Thus, only one device, e.g., the TAD 11 as shown in FIG. 4, may utilize a call related information detector/receiver 51. This may cause an inconvenience to the user, who may not be located within easy view of the display 49 of the one device (e.g., the telephone answering device 11), when the incoming telephone call arrives. Thus, the user must either not rely on the Caller ID capability of the distant device (e.g., the telephone answering device 11), or must run to the room containing the device including the Caller ID capability. Needless to say, this may at times be inconvenient for the user.

Accordingly, there exists a need for a telephone system which is capable of sharing call related information and other synchronizing data between multiple telephone devices within a home.

SUMMARY OF THE INVENTION

In accordance with the principles of the present invention, a customer premises equipment is capable of synchronizing data with other customer premises equipment. The customer premises equipment comprises a controller, a telephone line interface connectable to a common telephone line and in communication with the controller, and a call related information detector/receiver in communication with the controller. A data transfer module is in communication with the controller. The data transfer module is adapted to communicate with other customer premises equipment in communication with the common telephone line.

A method for sharing data between a plurality of telephone devices installed on a common telephone line in accordance with another aspect of the present invention comprises designating one of the plurality of telephone devices as a master telephone device, and the remaining one or more of the plurality of telephone devices as slave telephone devices. Data is transferred from the master telephone device to at least one of the slave telephone devices over the common telephone line.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a technique and apparatus for multiple telephone devices to communicate with one another to share or synchronize data. Multiple telephone devices capable of transferring data such as call related information (e.g., Caller ID information) are installed on a common telephone line in accordance with the principles of the present invention.

Thus, the invention may be used to pass call related information from a receiving device to other devices on a common telephone line. The transferred data may relate, e.g., to the telephone number and/or household name received with respect to a current incoming telephone call, and/or to an archival log of past call related information.

In accordance with the disclosed embodiment, the devices communicate after the telephone line is activated, e.g., by the receipt of a ring signal or dial tone. However, the principles of the present invention are equally applicable to communication before and/or after activation of the telephone line.

The present invention, while described with reference to a telephone answering device and speakerphone, is applicable to a wide range of telephone devices, including, but not limited to, voice messaging systems in general, cordless telephones, common telephones, etc.

Figure 1:
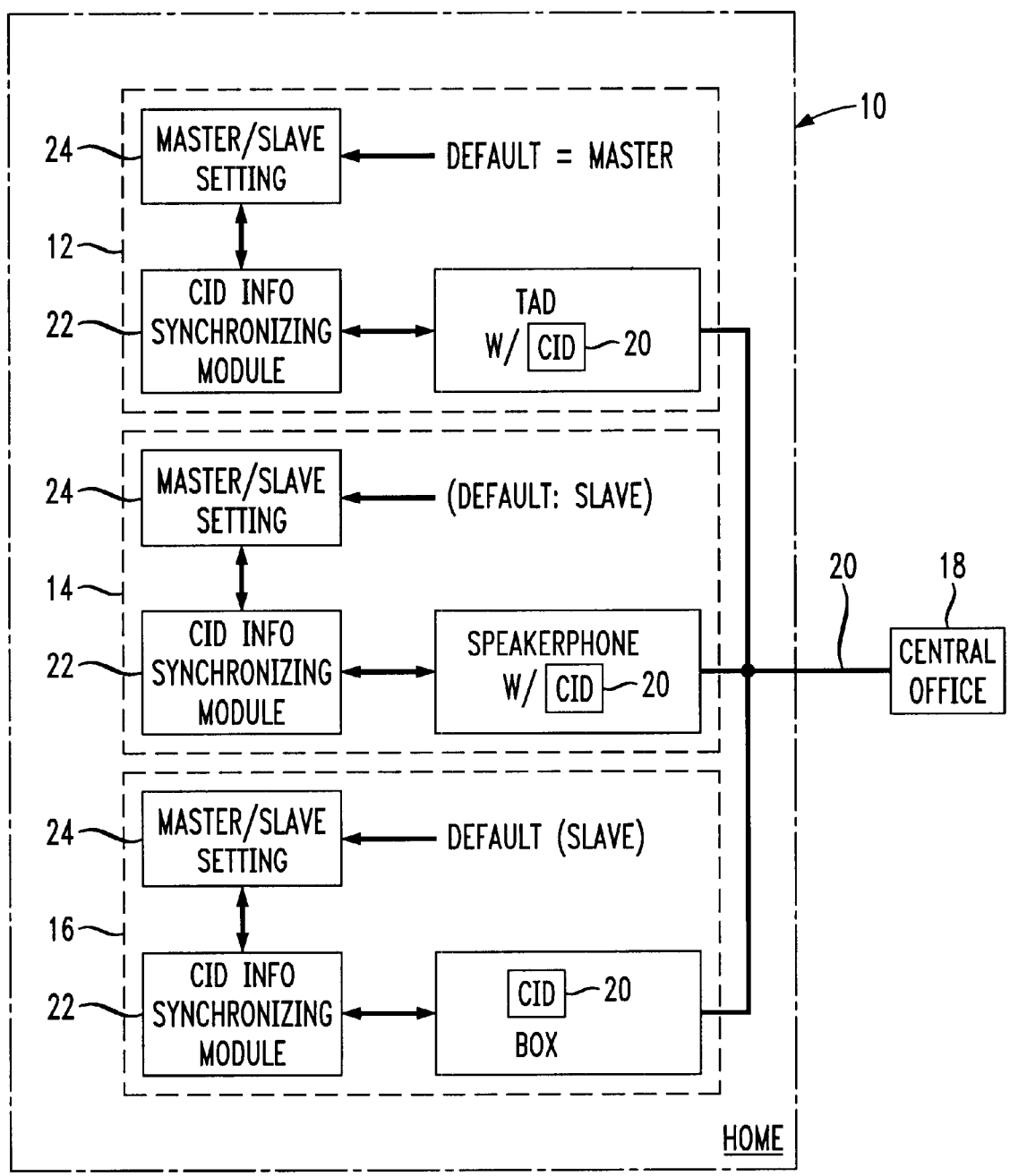
FIG. 1 is a block diagram illustrating multiple telephone devices installed on a common telephone line within a home, and which are capable of sharing data such as call related information between the multiple telephone systems, constructed in accordance with the principles of the present invention.

FIG. 1 illustrates a telephone system, indicated generally at 10, including a plurality of telephone devices installed on a common telephone line 20 from a central office 18. In the disclosed example, the plurality of telephone devices include a telephone answering device 12, a speaker telephone 14, and a common telephone 16. In the disclosed example, all of the plurality of telephone devices 12, 14 and 16 are capable of receiving call related information (e.g., Caller ID information), but only one of the devices is designated as the master device responsible for acknowledging receipt of call related information to the central office, and for controlling transfer of the received data to and between each of the other devices, e.g., 14 and 16, over the common telephone line 20.

Thus, the non-master designated telephone devices, e.g., the speakerphone 14 and the common telephone 16, are designated as slave devices. The slave telephone devices 14, 16 depend upon the master telephone device 12 to control the transfer of data to and from the master device 12. Data may be transferred between two slave devices, e.g., by two separate data transfers, i.e., a first data transfer from the first slave device to the master device, and a second data transfer from the master device to the second slave device.

In certain implementations, the master device may be manually or automatically selected, with all other relevant telephone devices being set to a slave mode. However, in certain backwards compatible applications, e.g., with a legacy master device, only the slave devices may be instructed to enter a slave mode, leaving the legacy device to operate as a default master device.

In the disclosed embodiment, while each of the telephone devices 12, 14, 16 has a call information detector/receiver 18 capable of detecting and receiving relevant call related information such as a telephone number and/or household name of a calling party (e.g., Caller ID information) from the central office 18, only one of the telephone devices 12, 14 and 16 is enabled to receive the relevant call related information from the central office 18. The other telephone devices, e.g., 14 and 16, are dependent upon the master telephone device, e.g., 12, as a source for their respective call related information.

In the disclosed embodiment, to establish the particular telephone device 12–16 which is designated as the master, each of the telephone devices preferably includes a master/slave setting 24 as shown in FIG. 1. If a telephone device does not include a master/slave setting 24, it may be presumed to be a slave device. The master/slave setting module 24 preferably is set to designate one of the telephone devices 12, for instance, as the master telephone unit and the remaining telephone devices 14, 16 as slave telephone units.

The master telephone unit 12 receives the call related information from the telephone company office 18 over the telephone line 20 and is capable of sending the same call related information to the slave telephone units 14, 16. It should be noted that one of the telephone devices 12 can be automatically designated as the default master telephone unit with the remainder of the telephone devices 14, 16 being designated as default slave telephone units. Moreover, in the event that a user erroneously designates more than one telephone device 12–16 as a master device, operation of the data transfer functions in accordance with the principles of the present invention may either be disabled pending correction of the condition, or may implement an arbitration scheme to override the master setting on all but one telephone device.

Importantly, each of the telephone devices 12, 14, 16 further includes a data transfer module 22 for transferring data, e.g., call related information and/or synchronizing information between the telephone devices 12, 14, 16.

Figure 2:
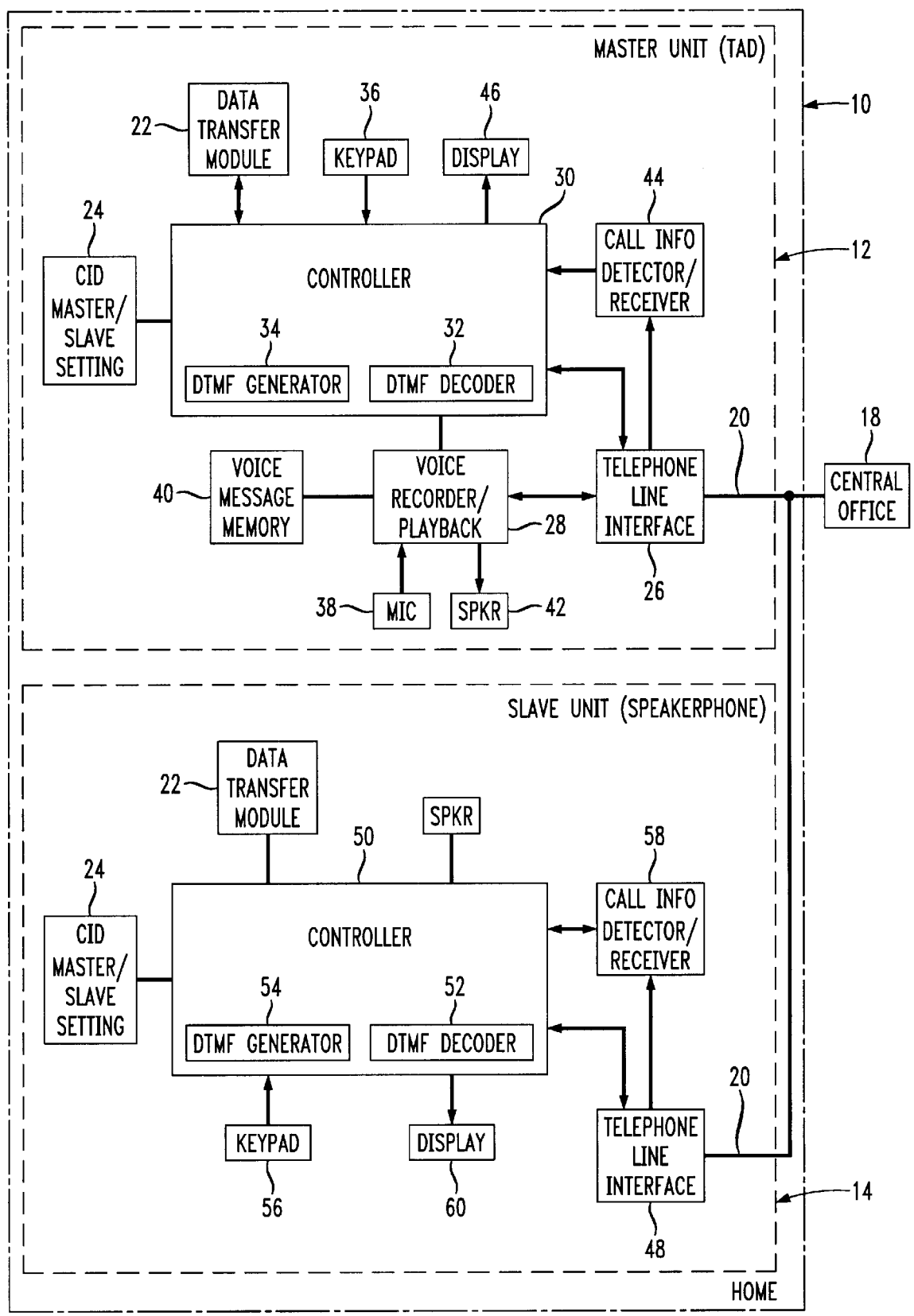
FIG. 2 is a more detailed block diagram illustrating a master/slave relationship between two telephone devices installed on a common telephone line, in accordance with the principles of the present invention.

FIG. 2 is a more detailed block diagram illustrating a master/slave relationship between two telephone devices installed on a common telephone line, e.g., between a telephone answering device 12 and a speakerphone 14, constructed in accordance with the principles of the present invention.

In particular, in the example of FIG. 2, the master/slave setting 24 of the telephone answering device 12 is set to a 'master' position, and the master/slave setting 24 of the speakerphone 14 is set to a 'slave' position. The master/slave settings 24 may be physical switches having two positions, or may be a register setting in the respective controllers 30, 50 established by the factory or the user.

The telephone answering device 12 and the speakerphone 14 each have a respective telephone line interface 26, 48 which are connected to the telephone central office 18 by the common telephone line 20.

The telephone line interface 26 interconnects the telephone line 20 with a conventional voice recorder/playback module 28. Furthermore, the telephone line interface 26 preferably interconnects the common telephone line 20 with a controller 30. The controller 30 may be any suitable processor, e.g., a microprocessor, a digital signal processor, or a microcontroller. The telephone line interface 48 of the speakerphone 14 interconnects the common telephone line 20 with its respective controller 50. This controller 50 too can be any suitable processor, e.g., a microprocessor, a digital signal processor, or a microcontroller.

The master telephone device, e.g., the telephone answering device 12, may communicate with slave devices, e.g., the speakerphone 14, using any suitable communication technique capable of utilizing the twisted pair of the common telephone line. For example, the communication technique may be as simple as utilization of conventional telephony techniques such as dual tone multi frequency (DTMF) signaling allowing very low bit rate communication, or as complex as quadrature amplitude modulation (QAM) allowing very high bit rate communication. In the case of QAM or other modem technique, the telephone devices 12–16 preferably include an appropriate modem device to transmit and receive the modulated signal. The disclosed embodiment relates to the use of common telephone elements, e.g., DTMF generators and decoders, to provide a communication technique.

Thus, the telephone answering device 12 of the present invention further includes a DTMF decoder 32 and a DTMF generator 34 implemented within the controller 30, and the speakerphone 14 likewise includes a complementary DTMF generator 54 and DTMF decoder 52. Although the respective DTMF generators 34, 54 and DTMF decoders 32, 52 are shown integrated within the respective controllers 30, 50, e.g., within the respective program code, the principles of the present invention relate equally to an implementation of the respective DTMF generators 34, 54 and DTMF decoders 32, 52 in separate devices external to the respective controllers 30, 50. In either case, the respective DTMF generators 34, 54 and DTMF decoders 32, 52 are preferably in communication with the respective controllers 30, 50.

The respective DTMF decoders 32, 52 and DTMF generators 34, 54 respectively detect and generate control signals generally relating to buttons pressed on a keypad 36 in a conventional telephone device. However, for use in data communication between telephone devices on a common telephone line in accordance with the principles of the present invention, the sixteen available DTMF codes may be utilized to uniquely represent hexadecimal digits in the data being transferred. Alternatively, two DTMF codes may be utilized to represent a single bit in either a '1' or '0' condition, with other DTMF codes utilized for control, e.g., for handshaking and synchronization of the communicating telephone devices 12, 14.

Furthermore, the telephone line interface 26 of the master device, e.g., the telephone answering device 12, interconnects the common telephone line 20 with a call related information detector/receiver 44 for detecting and receiving, e.g., Caller ID information. The received Caller ID information may be processed by the controller 30, stored in an appropriate Caller ID log in memory, and/or displayed on the receiving device, e.g., on a display 46 of the telephone answering device 12.

Thereafter, the master device, e.g., the telephone answering device 12, initiates transfer of the received call related information to the other devices on the common telephone line 20, e.g., to the speakerphone 14. This initiation preferably occurs immediately after the master device, e.g., the telephone answering device 12 receives the call related information.

To do this while the telephone line is active, a predetermined DTMF tone based control sequence may be output by the master device. The control sequence is intended to be recognized by the central office 18 and interpreted so that the central office 18 will ignore the subsequent data transfer between the telephone devices 12, 14 on the telephone line 20.

The control sequence may additionally be interpreted by any/all slave devices, e.g., the speakerphone 14, as an indication that data is about to be transferred from the master device, e.g., from the telephone answering device 12. Alternatively, subsequent to the control sequence intended as an indication to the central office 18 to ignore subsequent communication signaling between the local telephone devices, a separate predetermined signaling may be sent to each slave device, either individually based on a unique addressing scheme between all devices on the common telephone line, or as a broadcast to all slave devices.

All communications on the common telephone line 20 are preferably controlled by the master device, and thus slave devices which desire to communicate with the master device must either buffer any messages to the master until the master requests such data from the slave, and/or carrier sense multiple access/collision detect (CSMA/CD) type communications can be established whereby all devices may contend for communication over the common telephone line 20.

Figure 3:
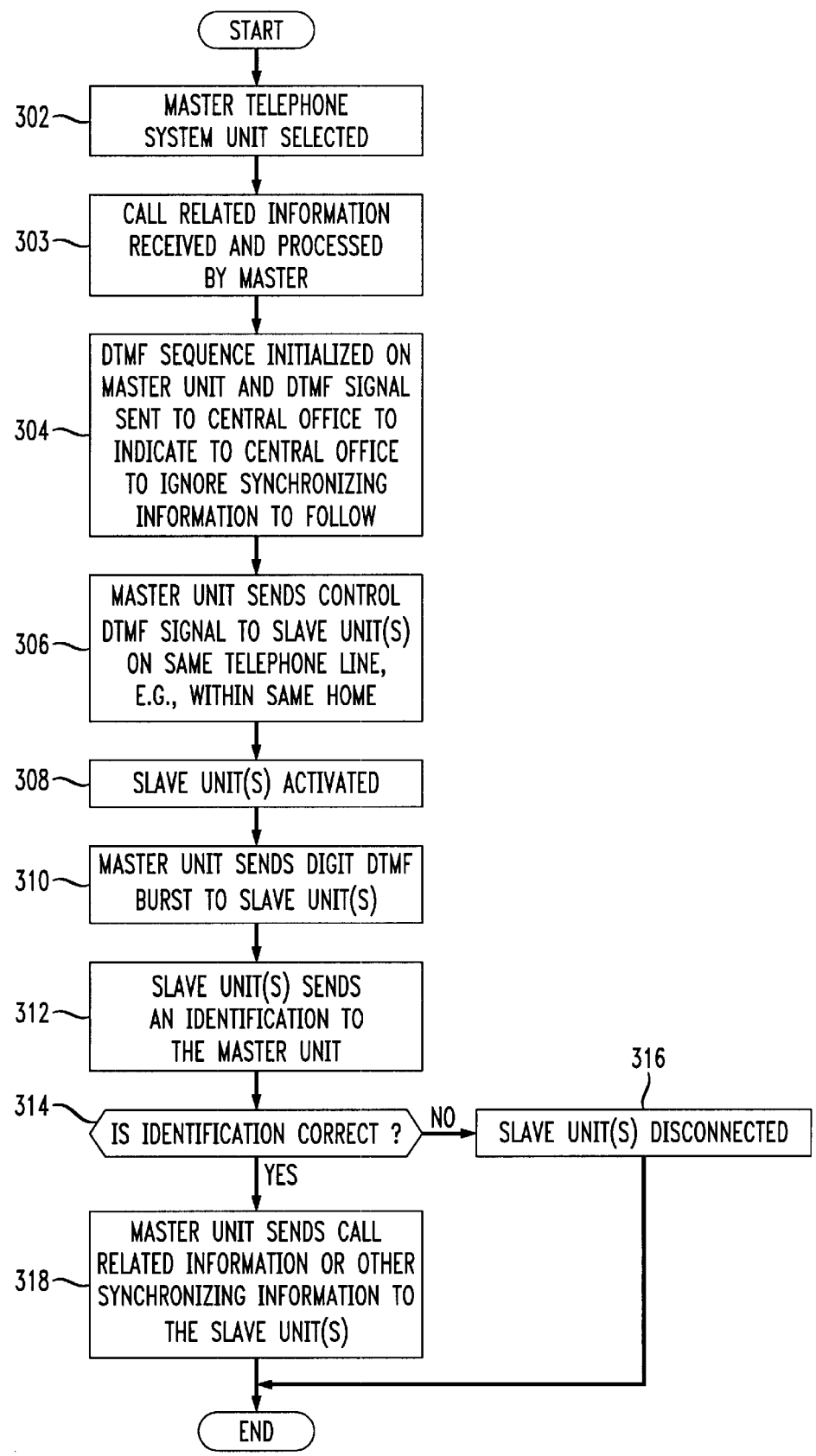
FIG. 3 is a flow chart illustrating an exemplary process by which multiple telephone devices each capable of receiving call related information coordinate communication with the central office and with each other, in accordance with the principles of the present invention.
Figure 4:
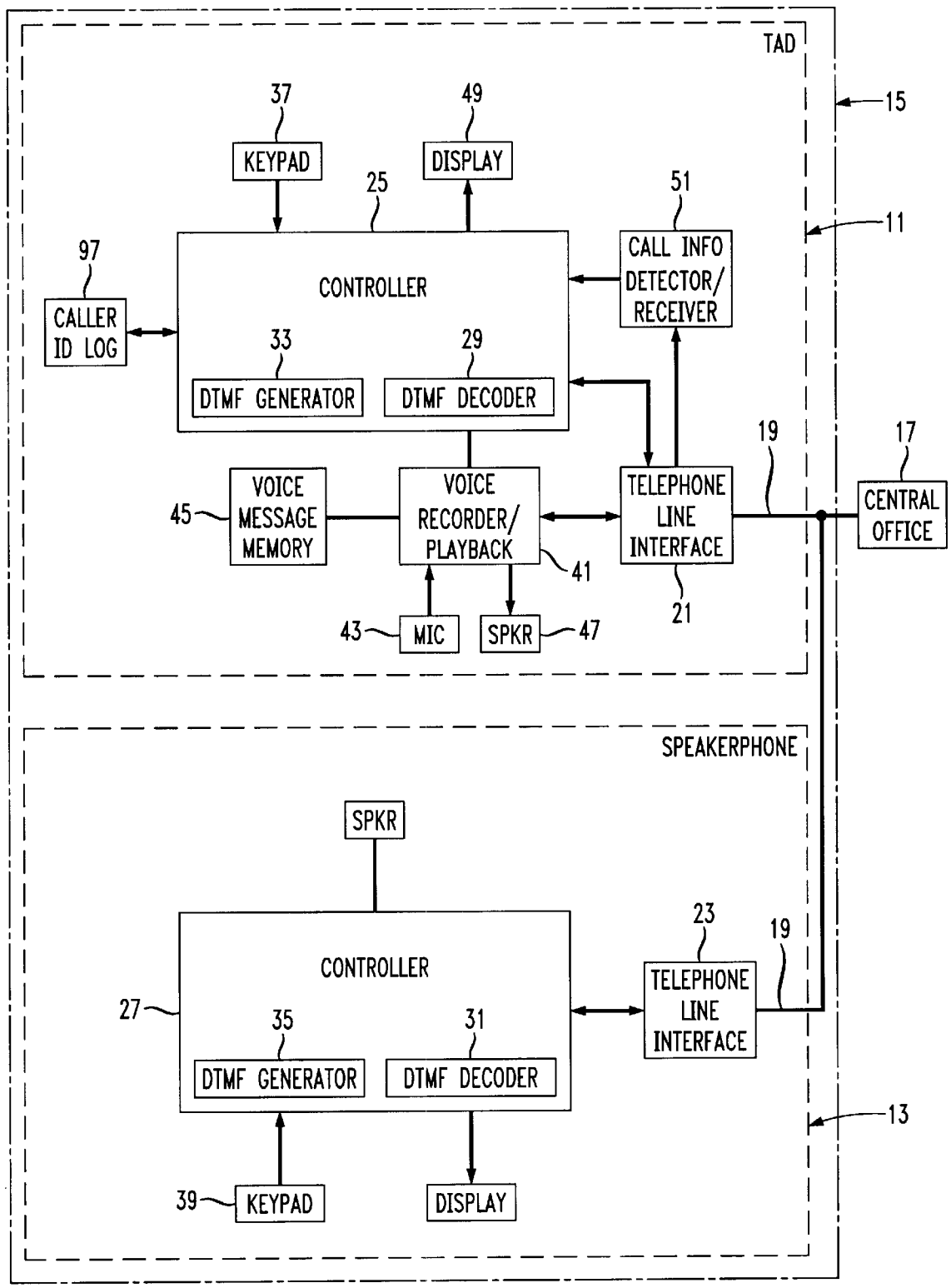
FIG. 4 illustrates a conventional technique of receiving Caller ID information on one of a plurality of telephone devices connected to a common telephone line.

FIG. 3 shows an exemplary process by which the master device, e.g., the telephone answering device 12, transfers data to the slave device(s), e.g., to the speakerphone 14, in accordance with the principles of the present invention.

In particular, in step 302, the master telephone device (e.g., the telephone answering device 12) is selected by the user or selected automatically.

In step 303, the telephone system is operated. For instance, an incoming call is received together with call related information (e.g., Caller ID information) from the central office 18. In the disclosed embodiment, the call related information is received and acknowledged only by the master telephone device, e.g., only by the telephone answering device 12 shown in FIG. 2. The slave devices will preferably receive the call related information, not from the central office 18, but instead from the master telephone device.

Thus, in step 304, the data transfer module 22 of the master device, e.g., the telephone answering device 12, will activate a predetermined DTMF code sequence using its DTMF generator 34 for output over the common telephone line 20 to the central office 18. The predetermined DTMF code sequence indicates to the telephone central office 18 to ignore any synchronizing information to follow on the common telephone line 20, either until another predetermined code sequence indicates the conclusion of the data transfer, or for a predetermined length of time, e.g., for the next 4 seconds.

In step 306, the data transfer module 22 of the master telephone unit, e.g., the telephone answering device 12, then communicates with the data transfer module(s) 22 of any relevant slave device installed on the common telephone line 20 utilizing, e.g., DTMF signaling.

In step 308, the control DTMF signaling from the master telephone device is detected by the data transfer module 22 of the slave device, e.g., the speakerphone 14.

In step 310, the master telephone unit then sends a DTMF signal burst representing transferred data (e.g., the received Caller ID information) to the intended slave device(s), either in point-to-point communication mode or in a broadcast mode.

In step 312, the slave telephone device(s) respond in acknowledgment to the received DTMF signal burst by, e.g., returning an identification number, address, or other system unique information to the master telephone device to inform the master device that the data Was received properly. The data may or may not be sent with error correction information, e.g., cyclic redundancy check (CRC).

In decision step 314, the master telephone device determines if the acknowledgment information received from the slave telephone device(s) is correct. If the acknowledgment information is not as expected, in step 316 the master telephone unit discontinues communication with that relevant slave telephone unit. The master device may indicate the error condition to the user and, after proper rectification, attempt to reestablish communication with the relevant slave device(s).

If, on the other hand, the acknowledgment information is as expected, in step 318 the master telephone device may then transfer the call related data or other synchronizing information to the slave telephone device(s).

In accordance with the principles of the present invention, not only can data relating to an incoming call be transferred among devices on a common telephone line, but archival information may also be transferred among telephone devices. For instance, along with current call related information, a portion of (or even all if time permits) historical call related information maintained in, e.g., a Caller ID log, may be transferred for archival storage on other telephone devices installed on the common telephone line. To reduce time requirements during an active call, the information may be broken into many packets which are each transferred during any of a sequence of subsequent telephone calls. The archival information may alternatively be transferred between ring signals after the initial call related information is received by the master device (e.g., between the first and second ring signals). Thus, the more rings that occur, the more archival data that may be transferred between telephone devices. In this case, the data transfer may preferably cease until receipt of the next incoming telephone call, when the incoming call is answered.

Thus, in accordance with the principles of the present invention, multiple telephone devices on a common telephone line may all contain relevant call related information, both relating to a current, incoming telephone call, as well as to archival information relating to past telephone calls received only by the master or other device, e.g., before certain telephone devices were installed.

The telephone system 10 of the present invention allows a designated telephone device to share call related information or other synchronizing information with other telephone devices within the home. A user of the telephone system 10 does not need to locate the particular telephone device with the Caller ID which received the call related information. The call related information is sent to all designated telephone devices having Caller ID capabilities for viewing by the user.

While the invention has been described with reference to the exemplary embodiments thereof, those skilled in the art will be able to make various modifications to the described embodiments of the invention without departing from the true spirit and scope of the invention.

What is claimed is:

1. A customer premises equipment capable of synchronizing data with other customer premises equipment, said customer premises equipment comprising:
    a controller;
    a telephone line interface connectable to a common telephone line and in communication with said controller;
    a call related information detector/receiver in communication with said controller; and
    a data transfer module in communication with said controller, said data transfer module adapted to communicate with at least one other customer premises equipment in communication with said common telephone line, and to communicate with a central office indicating that said central office should not act on subsequent data transfer signaling on said common telephone line.

2. The customer premises equipment according to claim 1, wherein:
    said data transfer module is adapted to transfer call related information to said other customer premises equipment.

3. The customer premises equipment according to claim 1, wherein:
    said call related information is Caller ID information.

4. The customer premises equipment according to claim 1, wherein:
    said data transfer module communicates with said other customer premises equipment using DTMF tones.

5. The customer premises equipment according to claim 1, further comprising:
    a modem.

6. The customer premises equipment according to claim 5, wherein:
    said data transfer module communicates with said other customer premises equipment using modulated signals transmitted by said modem.

7. The customer premises equipment according to claim 1, further comprising:
    a master/slave selection.

8. The customer premises equipment according to claim 1, wherein:
    said other customer premises equipment are designated as slave devices.

9. The customer premises equipment according to claim 1, wherein:
    said data transfer unit is further adapted to signal an activation of other data transfer units in respective ones of said other customer premises equipment.

10. The customer premises equipment according to claim 1, wherein said customer premises equipment comprises:
    a telephone answering device.

11. A method for sharing data between a plurality of telephone devices installed on a common telephone line, said method comprising:
    designating all but one of said plurality of telephone devices as slave telephone devices;
    indicating to a central office that data transfer signaling on the common telephone line should not be acted on; and
    transferring data between said all but one telephone devices and said one telephone device over said common telephone line.

12. The method for sharing data between a plurality of telephone devices installed on a common telephone line according to claim 11, wherein:
    said data is transferred to said all but one telephone devices from said one telephone device.

13. The method for sharing data between a plurality of telephone devices installed on a common telephone line according to claim 11, wherein:
    said data is transferred during a ring cycle of an incoming telephone call.

14. The method for sharing data between a plurality of telephone devices installed on a common telephone line according to claim 11, wherein:

said data is transferred while said common telephone line is active.

15. The method for sharing data between a plurality of telephone devices installed on a common telephone line according to claim 11, wherein:

said data is transferred using DTMF tones.

16. The method for sharing data between a plurality of telephone devices installed on a common telephone line according to claim 11, wherein:

said data is transferred using a modulated data signal.

17. The method for sharing data between a plurality of telephone devices installed on a common telephone line according to claim 11, wherein:

said transferred data is synchronized data between said master telephone device and said slave telephone devices.

18. Apparatus for sharing data between a plurality of telephone devices installed on a common telephone line, said apparatus comprising:

means for designating all but one of said plurality of telephone devices as slave telephone devices;

means for indicating to a central office that data transfer signaling on the common telephone line should not be acted on; and means for transferring data between said all but one telephone devices and said one telephone device over said common telephone line.

19. The apparatus for sharing data between a plurality of telephone devices installed on a common telephone line according to claim 18, wherein:

said data is transferred during a ring cycle of an incoming telephone call.

20. The apparatus for sharing data between a plurality of telephone devices installed on a common telephone line according to claim 18, wherein:

said data is transferred while said common telephone line is active.

21. The apparatus for sharing data between a plurality of telephone devices installed on a common telephone line according to claim 18, wherein:

said data is transferred using DTMF tones.

22. The apparatus for sharing data between a plurality of telephone devices installed on a common telephone line according to claim 18, wherein:

said data is transferred using a modulated data signal.

23. The apparatus for sharing data between a plurality of telephone devices installed on a common telephone line according to claim 18, wherein:

said transferred data is synchronized data between said master telephone device and said slave telephone devices.

* * * * *